United States Patent
Schreiber

(10) Patent No.: US 8,677,622 B2
(45) Date of Patent: Mar. 25, 2014

(54) INTAKE CONE IN A FIBER COMPOUND MATERIAL FOR A GAS TURBINE ENGINE AND METHOD FOR ITS MANUFACTURE

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 948 days.

(21) Appl. No.: 11/716,598

(22) Filed: Mar. 12, 2007

(65) Prior Publication Data
US 2008/0022524 A1 Jan. 31, 2008

(30) Foreign Application Priority Data
Mar. 10, 2006 (DE) .......................... 10 2006 011 513

(51) Int. Cl.
*B21K 25/00* (2006.01)
(52) U.S. Cl.
USPC .................. 29/889.2; 428/114; 428/300.4
(58) Field of Classification Search
CPC ............................. B29C 53/585; B64C 11/14
USPC ........ 29/889.2, 889.71, 458, 460, 527.2, 557; 428/114, 221–222, 297.4, 298.1, 428/299.1, 299.4, 300.4, 300.7
See application file for complete search history.

(56) References Cited

U.S. PATENT DOCUMENTS

| | | | |
|---|---|---|---|
| 3,031,361 A * | 4/1962 | Strickland | 343/872 |
| 3,115,271 A * | 12/1963 | Anderson et al. | 343/872 |
| 3,515,501 A | 6/1970 | Palfreyman et al. | |
| 3,625,634 A | 12/1971 | Stedfeld | |
| 3,711,350 A * | 1/1973 | Witzel, III | 156/169 |
| 3,990,814 A * | 11/1976 | Leone | 416/245 R |
| 4,089,727 A * | 5/1978 | McLain | 156/350 |
| 4,182,495 A * | 1/1980 | Borgmeier et al. | 239/265.11 |
| 4,191,510 A | 3/1980 | Teysseyre et al. | |
| 4,211,818 A * | 7/1980 | Ackley | 428/367 |
| 4,220,497 A * | 9/1980 | Carley | 156/174 |
| 4,368,234 A * | 1/1983 | Palmer et al. | 442/186 |
| 4,381,960 A * | 5/1983 | Pinter et al. | 156/175 |
| 4,385,952 A * | 5/1983 | Futakuchi et al. | 156/174 |
| 4,393,650 A * | 7/1983 | Pool | 60/39.093 |
| 4,397,609 A | 8/1983 | Kochendorfer | |
| 4,631,101 A * | 12/1986 | Rix | 156/175 |

(Continued)

FOREIGN PATENT DOCUMENTS

CH 497641 11/1970
DE 29 24 602 A1 8/1980

(Continued)

OTHER PUBLICATIONS

D.B. Miracle & S.L. Donaldson: "vol. 21 Composites" *Filament Winding*; McLarty, J. Lowrie, XP-002488464, Abstract only.

*Primary Examiner* — David Bryant
*Assistant Examiner* — Jacob Cigna
(74) *Attorney, Agent, or Firm* — Timothy J. Klima; Shuttleworth & Ingersoll, PLC

(57) ABSTRACT

On an intake cone made of fiber compound material for a gas turbine engine, the conical part, the attachment part and the fairing part are manufactured as one piece from a plurality of mutually crossing and covering winding layers (1) forming an interlace (2). The winding layers include parallel, alternately adjacent glass fiber strands and carbon fiber strands of equal thickness. The one-piece intake cone is producible and mountable cost-effectively and is characterized by elasticity, stiffness and impact resistance.

9 Claims, 2 Drawing Sheets

(56) References Cited

U.S. PATENT DOCUMENTS

Figure 1:
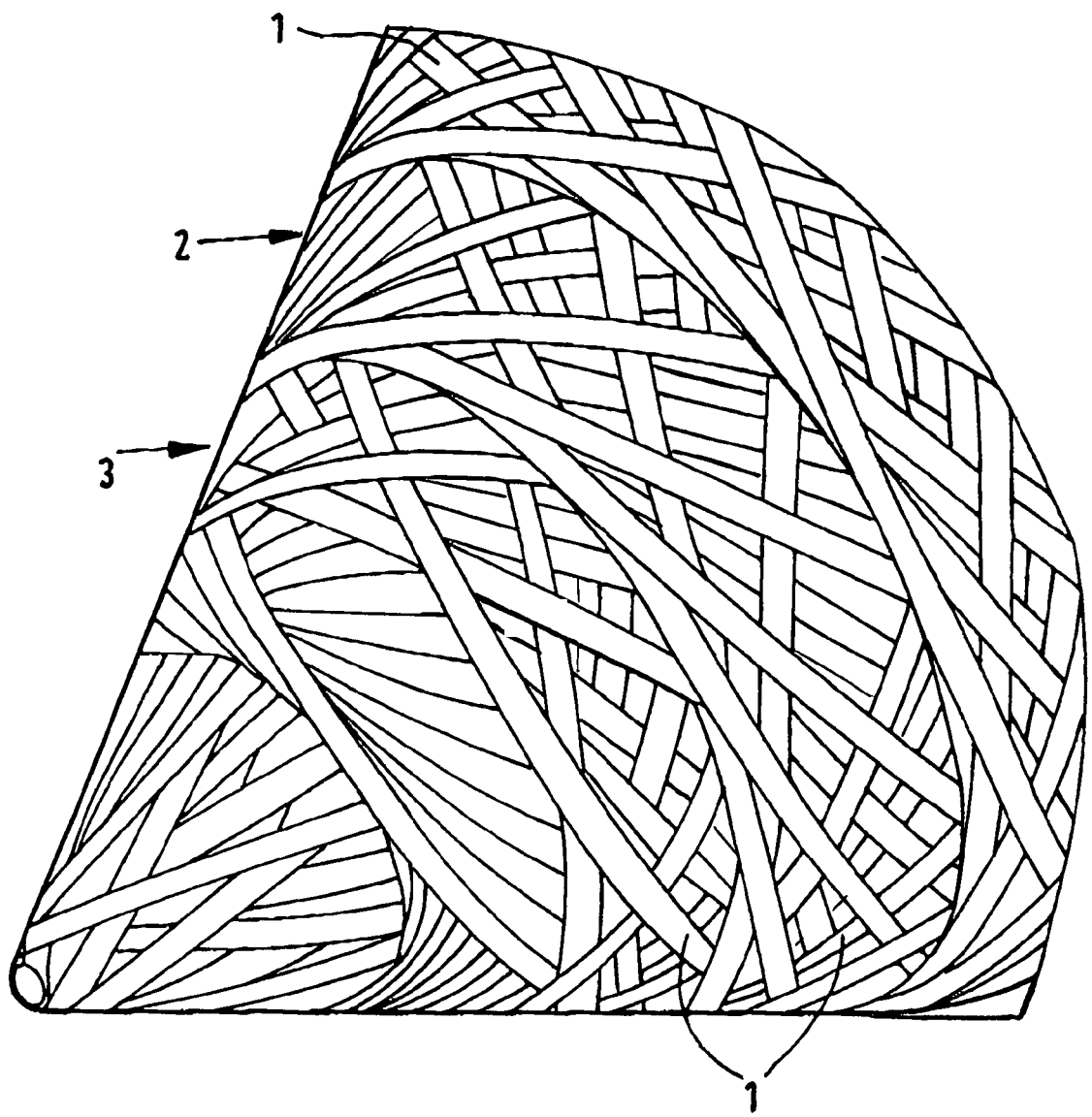

| | | | |
|---|---|---|---|
| 4,693,140 A | | 9/1987 | Stephan |
| 4,699,568 A | * | 10/1987 | Harlamert et al. ............... 416/95 |
| 4,751,135 A | * | 6/1988 | Fenton ........................... 428/188 |
| 4,957,415 A | * | 9/1990 | Paul et al. .................. 416/245 R |
| 5,149,251 A | * | 9/1992 | Scanlon et al. ............ 416/245 R |
| 5,400,505 A | | 3/1995 | Wei et al. |
| 5,487,806 A | * | 1/1996 | Viellard ........................ 156/175 |
| 5,525,035 A | * | 6/1996 | Ben-Porat et al. ............. 415/200 |
| 6,358,014 B1 | * | 3/2002 | Chou et al. ................. 416/245 R |
| 6,375,125 B1 | * | 4/2002 | Kirn et al. ................... 244/172.3 |
| 6,447,255 B1 | * | 9/2002 | Bagnall et al. ............ 416/245 R |
| 7,011,490 B2 | | 3/2006 | Albrecht |
| 7,938,627 B2 | * | 5/2011 | Muller .......................... 416/230 |
| 2008/0022524 A1 | * | 1/2008 | Schreiber .................. 29/889.21 |
| 2010/0051112 A1 | * | 3/2010 | Dieling ........................ 137/15.1 |

FOREIGN PATENT DOCUMENTS

| | | | |
|---|---|---|---|
| DE | 30 37 388 | | 6/1982 |
| DE | 83 24 715 U1 | | 5/1985 |
| DE | 27 39 702 | | 5/1987 |
| DE | 43 24 755 | | 9/1994 |
| DE | 195 03 939 C1 | | 6/1996 |
| DE | 19503939 C1 | * | 6/1996 |
| DE | 198 10 119 A1 | | 9/1999 |
| DE | 102 18 459 | | 4/2002 |
| DE | 103 50 974 | | 6/2005 |
| GB | 547433 A | * | 8/1942 |
| GB | 681859 A | * | 10/1952 |
| GB | 2 042 010 | | 9/1980 |

* cited by examiner

INTAKE CONE IN A FIBER COMPOUND MATERIAL FOR A GAS TURBINE ENGINE AND METHOD FOR ITS MANUFACTURE

This application claims priority to German Patent Application DE 10 2006 011 513.9 filed Mar. 10, 2006, the entirety of which is incorporated by reference herein.

This invention relates to an intake cone in a fiber compound material for a gas turbine engine, especially a turbofan gas turbine engine, including a conical part, a base part and a fairing part, and made of fibers embedded in a resin.

Such mostly tapered intake cones are intended to provide a swirl-free inflow into the engine, as far as possible, and to limit damage by impinging foreign objects or particles, especially bird strikes.

On an intake cone made of fiber compound material known from specification GB 0 102 169, for example, the conical part in the form of a cone tip is extended by a cylindrical attachment or base part with a mounting flange. Via the flange, the intake cone is axially attached to the fan rotor. To obtain a swirl-free inflow to the fan blades also with this advantageous type of intake cone attachment, the cylindrical base part is covered by a separate fairing conformal with the conicity of the conical part and made, for example, of titanium. Besides the required manufacturing and assembly effort, the two-piece design is also aerodynamically disadvantageous.

Known methods for the manufacture of intake cones in a fiber compound material for engines are resin injection processing and the more frequently used "prepreg" autoclave processing.

In resin injection processing, resin is infiltrated into a dry fiber body in a mold by means of vacuum and cured under the influence of heat. Problematic here is the sometimes non-uniform infiltration of the resin. A reduced degree of infiltration may result in irregularities in the material structure which may affect the impact behavior of the intake cone.

Intake cones made by "prepreg" autoclave processing show improved impact properties. In this process, segments preimpregnated with epoxy resin and made of a glass-fiber weave, in which the resin is evenly distributable beforehand, are manually placed in a mold with negative intake cone geometry in a precisely defined position. Curing is accomplished under pressure produced by vacuum and the influence of heat. Apart from the fact that material weaknesses may occur at the seams, "prepreg" processing disadvantageously incurs high manufacturing effort.

The present invention, in a broad aspect, provides for the development, and for a method of manufacture, of a gas-turbine engine intake cone in fiber compound material which is producible and mountable with low effort while being highly resistant to impact by impinging birds or other objects or particles, respectively.

It is a particular object of the present invention to provide solution to the above problems by an intake cone designed in accordance with the features described herein, and by a method for its manufacture in accordance with the features described herein. Advantageous developments of the present invention will be apparent from the description below.

In accordance with the underlying idea of the present invention, the conical part, the attachment part and the fairing part of a gas-turbine engine intake cone in fiber compound material are integrally made of a wound interlace comprising a multitude of mutually crossing and covering winding layers including glass fiber strands and carbon fiber strands of similar thickness in alternate and parallel arrangement. The resultant resin-soaked weave is characterized by stiffness and elasticity as well as high impact resistance. One-piece manufacture with simultaneously formed-on material reinforcements serving as abutment, mounting or centering rings results in low manufacturing cost as well as low assembly effort. Crucial here is the formation of the winding layers. Moreover, the stiffness-increasing carbon fiber strands in combination with the elastic glass fiber strands, by virtue of the bridging effect between the glass fibers, provide a synergistic effect in that impacts onto the intake cone are taken up and passed on. Even if carbon fibers fail under high impact energy, the connection between the glass fibers and the adjacent carbon fibers—and thus the functioning of the intake cone—is maintained by the so-called "bridging effect".

In the method according to the present invention, the winding layers are wound in a dry and/or preimpregnated condition onto a conical mold core. A resin is infiltrated into the weave. A resin coating is applied to the surface. Basically, the winding layers may also be passed through a synthetic resin bath prior to winding. Curing of the resin is accomplished in a known manner by pressure and heat. Subsequently, the abutment, centering and mounting reinforcements and the insertion area of a rubber tip of the intake cone can be machined.

Figure 2:
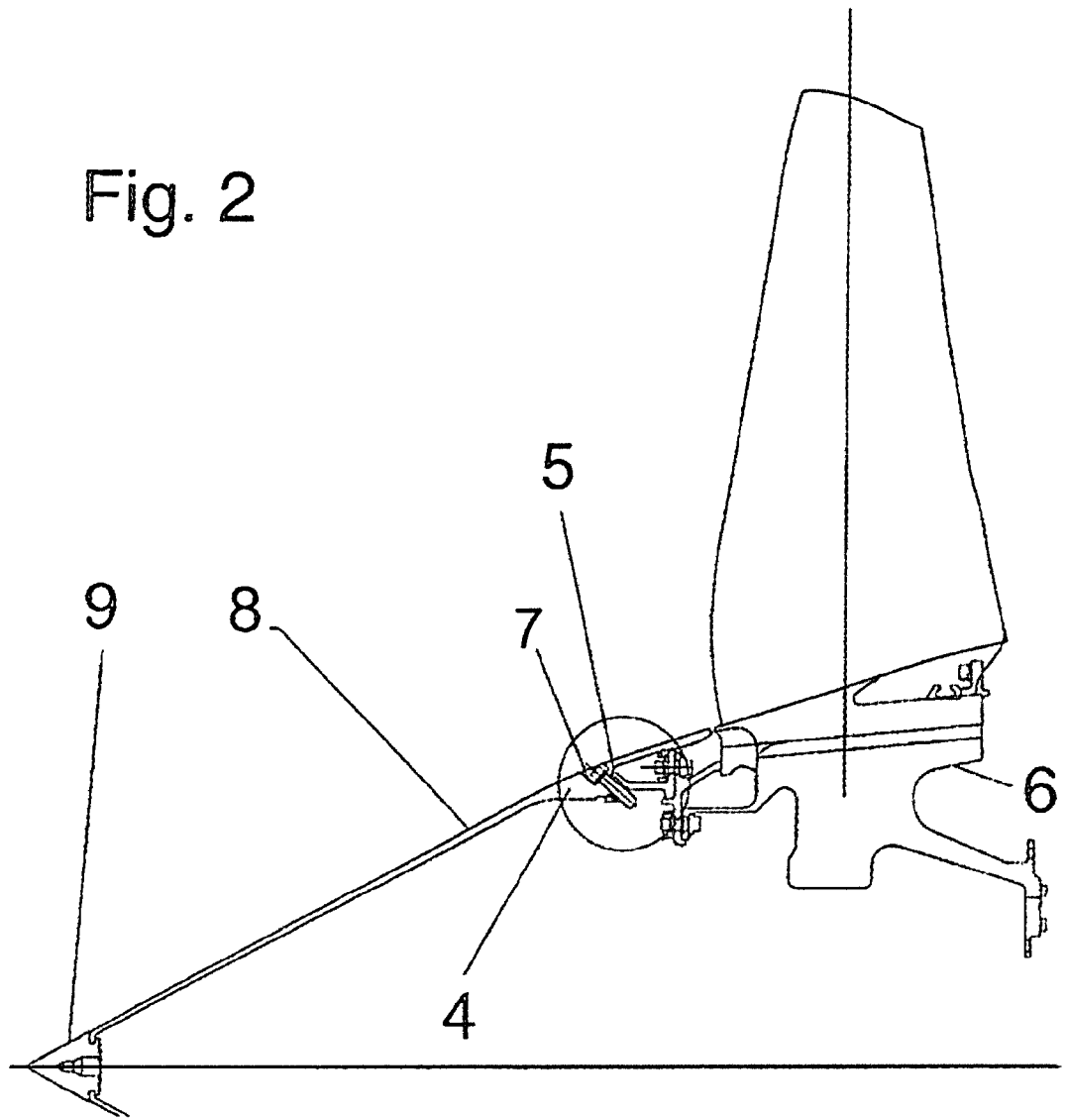

The present invention is more fully described in the light of the accompanying Figures showing a preferred embodiment, wherein:

FIG. 1 represents a prefabricated intake cone made of winding layers mutually crossing at different angles, FIG. 2 is a partial view of a wound one-piece intake cone connected to a fan rotor by means of a radial threaded attachment.

On an inner mold consisting of a conical core (not shown), winding layers 1 are continually wound which consist of dry or preimpregnated glass and carbon fiber strands of the same thickness in alternate and parallel arrangement. By use of several winders (not shown), the winding layers 1 are wound onto the cone core at different angles and under formation of an interlace 2, i.e. crossing and covering each other, thus forming an intake cone 3 of interlaced winding layers 1. Winding of the various—individual—winding layers onto the cone core can be coordinated such that circumferential material reinforcements are formed on the inner circumference of the intake cone 3. These material reinforcements 4, 5 are used for radial threaded attachment (4) and/or centering or as an axial abutment face (5) of the finished intake cone 8 on the fan rotor disk 6 and may also form circumferential reinforcing ribs (not shown) to strengthen the intake cone, in particular in the intake cone center area highest loaded by bird strike. An outer mold is then brought into engagement with the inner mold to form a mold cavity in which the winding layers are positioned. An epoxy resin is injected into the mold cavity and infiltrated into the weave (interlace 2) of the finish-wound intake cone 3 against a vacuum according to the known RTM method (Resin Transfer Molding) and cured under pressure and heat. A smooth surface coating is applied to the surface. Upon curing of the intake cone 3 and removal from the mold, finish-machining is accomplished, including, inter alia, producing mounting holes and sunken holes 7 for attaching the finished intake cone 8 to the fan rotor disk 6 and safely fixing a rubber tip 9 of the finished intake cone 8.

The one-piece intake cone produced to the above method, by virtue of the one-piece winding process with material reinforcements formed onto the inner wall, is producible and mountable cost-effectively and with low effort and is characterized by high stiffness and resistance to impact and erosion. Delamination effects, as may occur on intake cones made from segments in "prepreg" processing, are not to be feared.

The advantageous mechanical properties result from the design of the intake cone as an interlace, the essentially straight or widely curved winding layers of straight (not bent) fiber strands and the parallel, alternately adjacent arrangement of similarly thick glass fiber and carbon fiber strands in one winding layer, that is, the glass fiber strands and carbon fiber strands are positioned side by side and generally wound as a tandem or conjoined single layer. The adjacent, parallel arrangement of elastic glass fibers and stiffness-improving carbon fibers provides for a synergistic effect in that, by virtue of this fiber arrangement, first carbon fibers may fail under a considerable mechanical load exerted on the intake cone, but that even the failed carbon fibers provide for bridging between the glass fibers, and the glass fibers between the carbon fibers can still take up and pass on the forces occurring, so that the impact energy is distributed and dissipated and the intake cone preserved as a whole.

LIST OF REFERENCE NUMERALS

1 Winding layer (glass fiber+carbon fiber)
2 Interlace
3 Double intake cone
4 Material reinforcement (radial threaded attachment)
5 Material reinforcement (axial abutment)
6 Fan rotor disk
7 Sunk holes, attachment holes
8 Intake cone
9 Rubber tip

What is claimed is:

1. A method for manufacturing an intake cone in a fiber compound material for a gas turbine engine, the intake cone including a conical part, an attachment part, a fairing part, and a longitudinal axis about which the intake cone rotates at a speed of a fan of a gas turbine engine, and constructed of fibers embedded in a resin and having an interlace, the method comprising:

winding a plurality of dry mutually crossing and covering winding layers on a conical molding core at different angles and under formation of the interlace, these winding layers are at least one chosen from essentially straight and widely curved and made of straight strands and include adjacent dry glass fiber strands and dry carbon fiber strands of similar thickness in a conjoined arrangement, the glass fiber strands and the carbon fiber strands individually arranged in an alternating and parallel arrangement within each layer, the glass fiber strands and the carbon fiber strands having a one to one ratio;

bringing another mold portion into engagement with the molding core to form a mold cavity in which the dry winding layers are positioned; and subsequently infiltrating the resin into the mold cavity and dry wound interlace such that the resin forms to the mold cavity to form a surface of the intake cone that is smoother than a surface of the winding layers prior to resin infiltration.

2. A method in accordance with claim 1, and further comprising curing the resin for the fiber compound material and the surface coating by the effect of pressure and heat.

3. A method in accordance with claim 1, and further comprising applying a resin to an outer surface of the intake cone.

4. A method in accordance with claim 1 wherein the intake cone further includes material reinforcements formed on an inner circumference in the winding process and used for at least one of the group of: threaded attachment mechanism, centering mechanism, axial abutment mechanism and stiffening mechanism; and further comprising machining the intake cone upon removal from the mold to produce the axial abutment and centering mechanisms as well as the attachment mechanism, and fixing a rubber tip to the intake cone.

5. A method in accordance with claim 4, and further comprising curing the resin for the fiber compound material by the effect of pressure and heat.

6. An intake cone for a gas turbine engine made by the method of claim 1.

7. An intake cone for a gas turbine engine made by the method of claim 2.

8. An intake cone for a gas turbine engine made by the method of claim 4.

9. An intake cone for a gas turbine engine made by the method of claim 3.

* * * * *